Oct. 16, 1951  F. R. PIPER ET AL  2,571,941
AUTOMATIC SHEET CUTTING AND STACKING MACHINE
Filed May 13, 1949  3 Sheets-Sheet 1
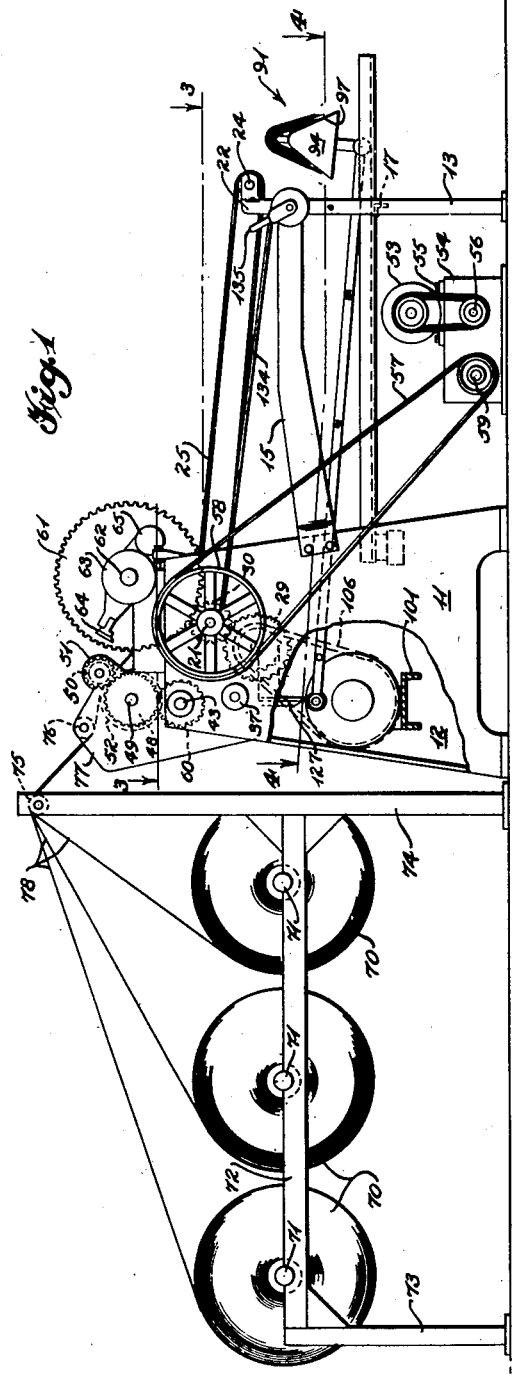
Inventors
Frank R. Piper and
James M. Gardner
By Cushman, Darby & Cushman
ATTORNEYS

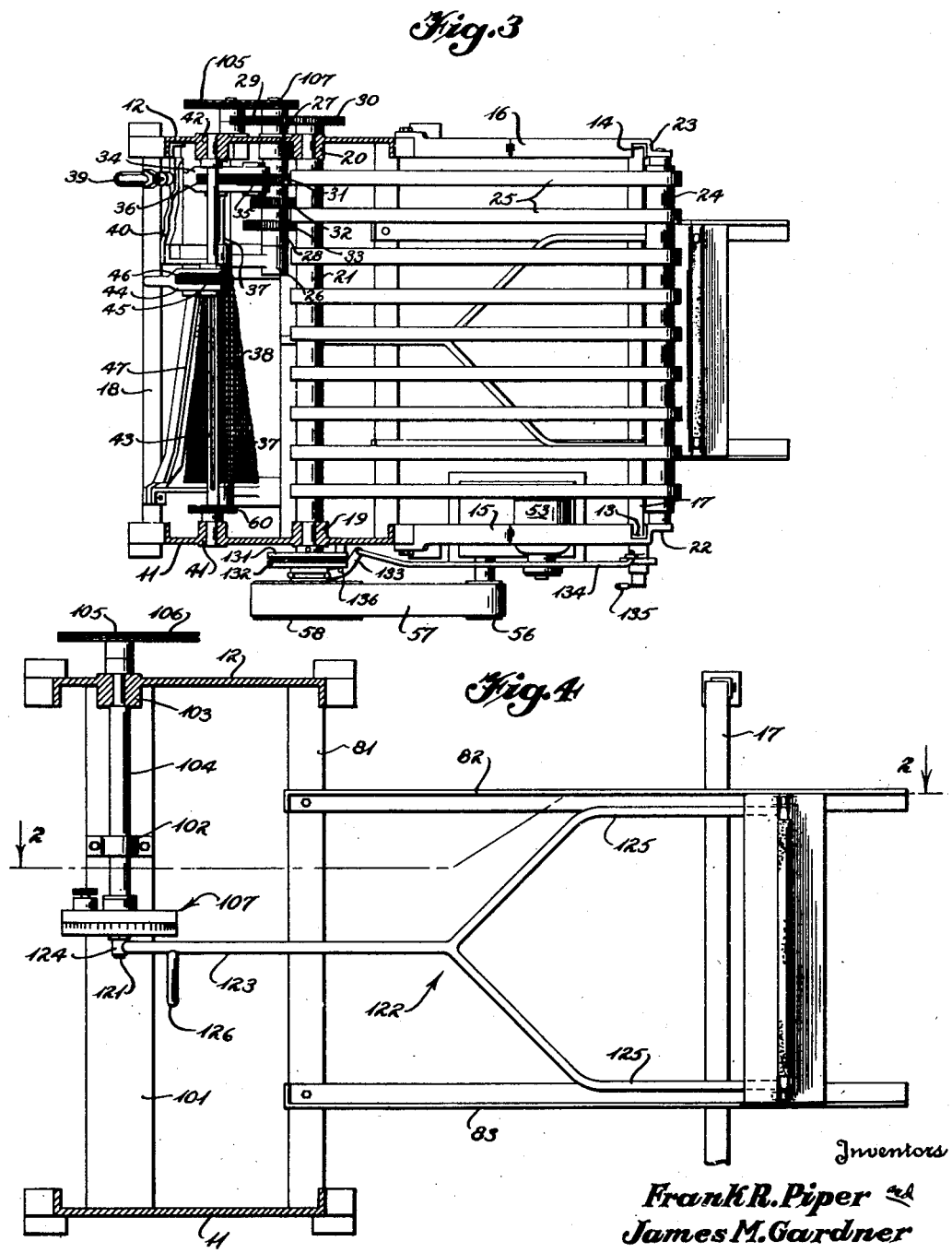

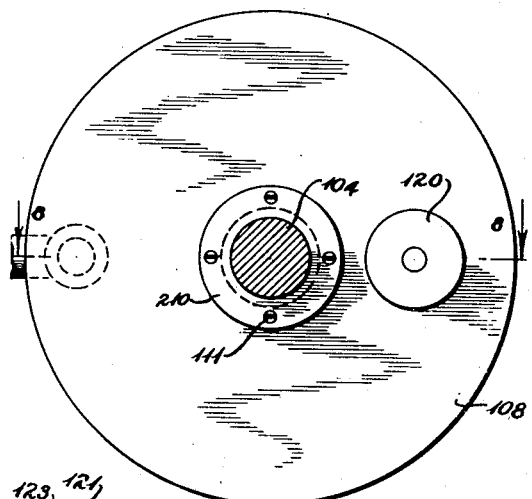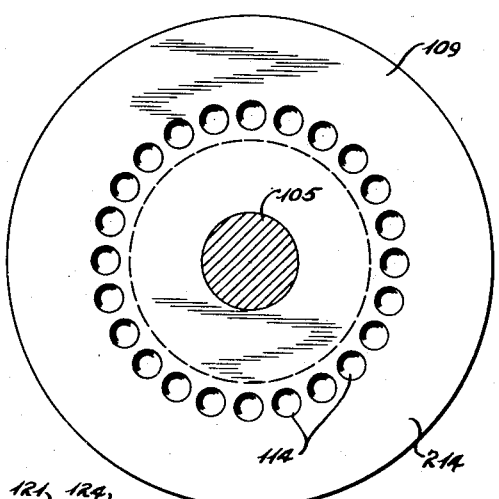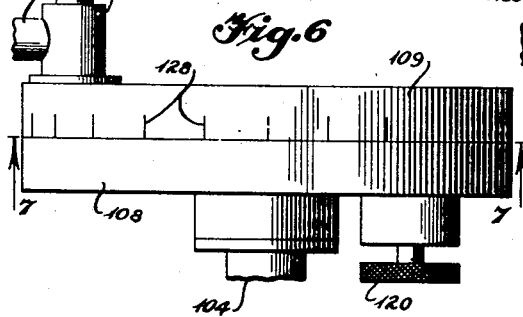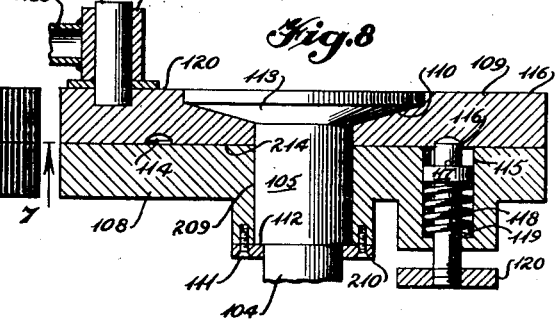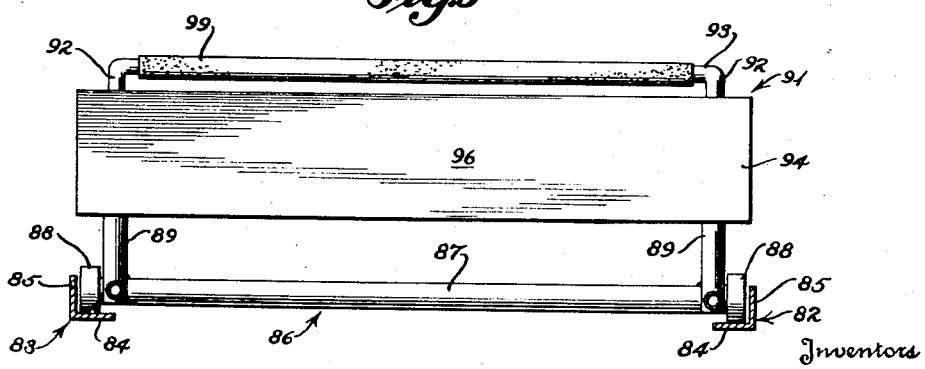

Patented Oct. 16, 1951

2,571,941

UNITED STATES PATENT OFFICE 2,571,941

AUTOMATIC SHEET CUTTING AND
STACKING MACHINE

Frank R. Piper and James M. Gardner, Fairfax, Ala., assignors to West Point Manufacturing Company, West Point, Ga., a corporation of Georgia Application May 13, 1949, Serial No. 93,172

8 Claims. (Cl. 164—68)

This invention relates to a machine for cutting a continuous sheet of material into segments and stacking said segments in aligned relation.

Sheet cutting machines are well-known in the art, as illustrated by the patent to Beck, Number 1,962,128, June 12, 1934. A primary object of this invention is to provide in combination with a sheet cutting mechanism as shown in the Beck patent a novel means for stacking the cut segments.

More particularly, it is an object of this invention to provide in combination a well-known mechanism for cutting a continuous sheet of paper, fabric or other material into segments of variable predetermined lengths and for successively placing said segments on a conveyor and a novel mechanism for successively receiving said segments from the conveyor in stacked relation.

A further object of the invention is to provide an adjustable means for regulating the operation of the receiving mechanism in accordance with the lengths of the segments being cut so as to enable the segments to be stacked in aligned relation irrespective of their particular lengths.

The invention further resides in certain novel structural features and operating details hereinafter described and illustrated in the attached drawings, in which:

Figure 1 is a side elevational view of the machine;

Figure 2 is a vertical sectional view on the line 2—2 of Figure 4;

Figure 3 is a horizontal sectional view on the line 3—3 of Figure 1;

Figure 4 is a horizontal sectional view on the line 4—4 of Figure 1;

Figure 5 is a front elevational detail view of the crank mechanism for reciprocating the stacking receiver;

Figure 6 is to top plan view of the crank mechanism shown in Figure 5;

Figure 7 is a vertical sectional view of the crank mechanism taken on the line 7—7 of Figure 6;

Figure 8 is a horizontal sectional view of the crank mechanism taken on the line 8—8 of Figure 5; and Figure 9 is an elevational detail view of the reciprocating carriage and stacking receiver taken on the line 9—9 of Figure 2.

Referring to the drawings, and particularly to Figures 1 and 3, the machine has a frame comprising two spaced parallel side frames 11 and 12 and two upright supporting members 13, 14 spaced therefrom. A brace member 15 is rigidly secured to the side frame 11 and the upright supporting member 13 and a brace member 16 is similarly joined to the side frame 12 and the upright supporting member 14. A horizontal angle member 17 is secured to the supporting members 13, 14 so as to hold them in rigid spaced relation with respect to each other and a horizontal member 18 is similarly secured to the side frames 11, 12. Integrally formed with the side frames 11 and 12 are oppositely disposed bearings 19, 20. Rotatably mounted within the bearings 19, 20 is a conveyor roll shaft 21. Flanges 22 and 23 are respectively secured to the upright supporting members 13 and 14 and each of the flanges 22, 23 has a bearing therein for rotatably mounting a second conveyor roll shaft 24. Looped around the conveyor roll shafts 21 and 24 are a plurality of spaced continuous conveyor belts 25. It will be obvious that a single wide conveyor belt may be substituted for the plurality of narrow belts 25.

Adjacent the roll shaft 21 are two bearing brackets 26 and 27 for rotatably mounting a shaft 28 therein. Fixed to the shaft 28 is a gear 29 non-rotatably mounted thereon and similarly secured to the roll shaft 21 is a gear 30 for engaging the gear 29. The shaft 28 also has gears 31, 32 and 33 of increasing diameter in the order recited and non-rotatably mounted thereon. A yoke 34 has rotatably mounted therein two mutually engaged gears 35 and 36. The gear 35 is adapted to engage selectively either of the gears 31, 32, 33 depending upon the position of the yoke 34. The gear 36 is non-rotatably and slidably mounted on a shaft 37 which, in turn, is rotatably mounted between the side frames 11, 12. The yoke 34 may be moved to either of the selected positions by means of the handle 39 and locked securely in the selected position by means of the slotted locking bar 40, as is well-known in the art and disclosed in detail in the above-cited patent to Beck.

Non-rotatably mounted on the shaft 37 is a plurality of contiguous gears 38 of successively increasing diameter so as to form a gear cone. Integrally formed with the side plates 11, 12 are oppositely disposed bearings 41 and 42 for rotatably mounting a shaft 43. Slidably keyed on the shaft 43 is a gear 45 which engages a gear 46, both gears 45 and 46 being rotatably mounted in a yoke 44. The gear 46 is adapted to selectively engage any one of the gears 38 depending upon the position of the yoke 44. A locking bar 47 is adapted to hold the yoke 44 in the selected position. A gear 60 is secured to the shaft 43 and engages an idler gear 48 which latter is mounted on a shaft 49 and freely rotatable with respect thereto. The gear 48, in turn, engages the feeding roll gear 50 which is non-rotatably secured to a driver feeding roll 51. An idler feeding roll 52 is mounted on the shaft 49 to cooperate with the driver feeding roll 51.

The gear 30 also engages a gear 61 secured to a rotatably mounted shaft 62. A cutting tool holder 63 is non-rotatably mounted on the shaft 62 and has at one end a cutting knife 64 and at the opposite end a counterweight 65.

The power source for the machine is shown in the form of an electric motor 53 connected by a belt 55 to the input shaft 56 of a gear transmission 54. The output shaft 59 of the transmission 54 drives a belt 57 which, in turn, drives a pulley 58 freely rotatable on the end of the conveyor roll shaft 21. A driven clutch plate 131 is fixedly secured to the shaft 21 and a driver clutch plate 132 is rotatably mounted with respect to the shaft 21 and adjacent the clutch plate 131 for engaging the latter. A lever 133 is pivoted intermediate its ends at 136 and has one end engaging an end of the clutch plate 132 whereby when the lever 133 is pivoted in a clockwise direction as viewed in Figure 3, the clutch plate 132 will be forced against the clutch plate 131 so as to form a driving connection therebetween and so as to allow the pulley 58 to drive the conveyor roll shaft 21. Connected to the other end of the lever 133 is a link 134 which, in turn, is connected to a clutch actuating handle 135 pivoted to the upright supporting member 13.

It will be thus seen that the actuation of the handle 135 serves to connect the conveyor roll shaft 21 to the power means so as to drive said shaft 21. The electric motor 53 operates at a constant speed and hence the roll shaft 21 will drive the conveyor belts 25 at a constant speed. The gear 30 which is secured to the roll shaft 21 drives the shaft 28 by means of the gear 29 secured to the latter. The motion of the shaft 28, in turn, imparts motion to the shaft 37 by means of gears 35, 36 and either of gears 31, 32 or 33. It will be thus seen that the angular speed of shaft 37 may be varied by selectively engaging the gear 35 with either of the gears 31, 32 or 33. Rotation of shaft 37, in turn, imparts motion to the shaft 43 through gears 38, 46 and 45. It will also be obvious that the angular speed of shaft 43 may be varied by selectively engaging gear 46 with any one of the gears 38. Rotation of the shaft 43 in turn causes the driver feeding roll 51 to rotate by means of gears 60, 48, and 50.

The continuous sheets of material to be cut into segments are shown in Figure 1 in the form of three rolls 70 rotatably mounted at 71 on a horizontal support 72 which, in turn, is mounted on the upright frame members 73 and 74. Adjacent the upper portion of the member 74 is a guide roll 75 and a second guide 76 is rotatably mounted on a bracket 77 of the machine. In this particular embodiment of the invention, there are shown three sheets of material being fed simultaneously to the machine but it will be understood that a single sheet or any number of sheets may be simultaneously fed, cut and stacked in superimposed relation.

The sheets 78 are drawn off the rolls 70 up around the guide roll 75 and thence down beneath the guide rolls 76 and through the feeding rolls 51 and 52 and over a stationary cutting knife (not shown). The rotation of the conveyor roll shaft 21 at constant speed will cause the gear 61 and hence the cutting blade 64 to rotate at a constant angular velocity. The rotary cutting blade 64 will sweep past the fixed cutting blade once during each cycle of revolution so as to cut segments from the continuous sheets 78 at definite constant intervals of time. In the embodiment shown in Figure 1 wherein three sheets 78 are simultaneously fed to the machine, a group of three superimposed segments will be cut from the three superimposed sheets 78 during each cycle of revolution of the rotary cutting blade 64. Obviously, the number of simultaneously-cut superimposed segments in the group will be equal to the number of sheets 78. It is to be understood that the terms "segment" and "group of segments" as used in the specification and particularly in the claims are intended to be synonymous and interchangeable depending upon whether a single sheet 78 or a plurality of sheets 78 are fed to the machine. The angular velocity of the driver feeding roll 51 may be adjusted by selectively positioning the yokes 34 and 44 and thereby the sheets 78 may be fed at a desired predetermined rate of speed. It will thus be seen that by passing the sheets 78 over the fixed cutter at different rates of speed, the constant velocity rotary cutter 64 will sever segments having lengths directly proportional to the speed of the driver feeding roll 51. The successively-cut groups of superimposed segments are allowed to fall upon the upper portions of the conveyor belts 25 successively at constant intervals of time irrespective of the lengths of the segments being cut.

Due to the fact that the rotary cutting blade 64 is geared to the conveyor roll shaft 21, the conveyor belt will move equal distances during each cutting cycle and hence the segment groups are positioned upon the upper portions of the belts 25 at constant intervals of belt length irrespective of the lengths of the segments being cut. Variation in the lengths of the segments will serve only to vary the gaps between successive segment groups lying upon the conveyor belts 25. The conveyor roll shaft 21 is rotated in a clockwise direction as viewed in Figure 1 so as to cause the upper portions of the looped belts 25 upon which the segment groups are successively placed to move in a direction away from the conveyor roll shaft 21 and toward the conveyor roll shaft 24 which latter is located at what may be termed the discharge end of the conveyor.

It is to be understood that the above-described mechanisms of the subject machine are old and well-known in the art and reference is made to the above-cited Beck patent for a more detailed structural and operational description. Hereinbelow will be described the improvements which, separately, and in combination with the above-described structure, comprise the subject invention.

Referring particularly to Figure 4, a horizontal supporting member 81 is secured between the side frames 11, 12 and parallel to the horizontal angle member 17. Supported on the members 81 and 17 and rigidly secured thereto are parallel horizontally-spaced track members 82 and 83 each of L-shaped formation and having a horizontal leg 84 and exterior vertical legs 85, as best shown in Figure 9. Supporting blocks 82', as shown in Figure 2, are mounted between track members 82, 83 and the horizontal supporting member 81 in order to provide clearance for a purpose to be described below. A carriage 86 is adapted to be slidably mounted on the track members 82 and 83 and comprises a horizontal bar 87 having wheels 88 rotatably mounted on the opposite ends thereof and adapted to ride upon the horizontal legs 84 of the track members 82, 83. Secured at opposite ends of the bar 87 are upright members 89 having sockets 90 extending throughout the upper portions thereof. A stacking receiver, indicated generally at 91 comprises two vertically-disposed members 92 adapted to be inserted and held in the sockets 90. As shown in Figure 2, a horizontally-disposed stack supporting member 94 is secured to the vertical members 92 by means of welding a cross brace 95 to the members 92 as at 196. It will be seen in Figure 2 that the stack supporting member 94 comprises two downwardly diverging walls 96 and 97 whereby the supporting member 94 is of a substantially prismatic shape and of a substantially inverted V-shape in cross-section. A horizontal stack supporting rod 93 is integrally formed with the vertical members 92. The upper rounded portion 98 of the stack supporting member 94 is downwardly spaced from the horizontal stack supporting rod 93. A longitudinal sleeve 99 formed of a material having a high coefficient of friction may be mounted on the stacking rod 93 for a purpose to be described below.

Rigidly secured between the side frames 11, 12 is a horizontal beam 101, as best shown in Figures 1 and 4. Secured to the beam 101 is a bearing 102 and integrally formed with the side frame 12 is an oppositely aligned bearing 103 for rotatably mounting a shaft 104. Fixedly secured to the end of the shaft 104 is a sprocket 105 driven by a chain drive 106 which in turn is driven by a sprocket 107 mounted on the shaft 28.

At the opposite end of the shaft 104 is an adjustable crank member indicated generally at 107. As best shown in Figures 5 to 8, the crank memebr 107 comprises a drive crank plate 108 and a driven crank plate 109. The plate 108 has an opening 209 therein for receiving the enlarged portion 105 of the shaft 104. The clearance between the opening 209 and the enlarged portion 105 is negative so as to provide a press fit and thereby prevent relative rotation between the plate 108 and the shaft 104. The shoulder plate 210 is secured to the plate 108 by means of screws 111 so as to abut the shoulder 112 and thereby prevent relative lateral displacement of the plate 108 and the shaft 104. At the end of the enlarged portion 105 is a substantially conical portion 113 of the shaft 104. The driven crank plate 109 has a conical recess 110 adapted to receive the conical portion 113 of the shaft 104. The driven crank plate 109 is freely rotatable on the shaft 104 and, therefore, free to rotate with respect to the drive crank plate 108.

Circularly disposed about the axis of the shafts are a plurality of recess 114 in that face 214 of the driven crank plate 109 which is adjacent the drive crank plate 108. Slidably mounted within a bore 115 within the drive crank plate 108 is a detent 116 adapted to be selectively engaged in the recesses 114. A collar 117 is secured to the detent 116 and a compression spring 118 surrounds the detent 116 and is adapted to exert a reaction against the bottom 119 of the bore 115 and against the collar 117 so as to bias the detent 116 outwardly of the bore 115 and into one of the recesses 114. A handle 120 is secured to the end of the detent 116 whereby the operator may withdraw the detent 116 from the particular recess 114 in which it may be engaged so as to allow for relative rotary movement of the crank plates 108 and 109. It will thus be seen that the crank plates 108 and 109 may be drivingly connected in any selected one of a plurality of alternative angular relationships depending upon which particular recess 114 is engaged by the detent 116.

Secured to the surface 120 of the driven crank plate 109 is a crank pin 121 offset with respect to the axis of the shaft 104. A substantially fork-shaped connecting rod 122 comprises a member 123 having a bearing 124 rotatably mounted on the crank pin 121. The opposite end of the connecting rod 122 comprises the legs 125 of the forked portion which are rigidly secured to the horizontal bar 87 of the carriage 86. A handle 126 extends from the member 123 adjacent the crank member 107 for manually manipulating the connecting rod 122 and the driven crank plate 109. It will thus be seen that rotation of the conveyor shaft roll 21 causes rotation of both the shaft 104 and the crank member 107 so as to reciprocate the carriage 86 and stacking receiver 91 in a horizontal plane adjacent and beneath the discharge end of the conveyor.

Operation

The yokes 34 and 44 are adjusted so as to position the gears 35 and 45 in engagement with respectively either of the gears 31, 32 or 33 and one of the cone gears 38, depending upon the desired length of the segments to be cut. The clutch actuating handle is then moved to operating position so as to engage clutch plates 131 and 132 and enable the motor 53 to drive the conveyor roll shaft 21. Rotation of the conveyor roll shaft 21 in turn drives the rotating cutting tool 64 in a counter-clockwise direction as viewed in Figure 1 and also causes the driver feed roll 51 to feed the sheets 78 at a constant predetermined speed over a fixed cutting blade (not shown). With each cycle of rotation of the rotary cutting blade 64, a segment will be cut from each of the sheets 78 to form a group of superimposed segments. Each successively-cut group of segments will fall upon the upper portion of the conveyor belts 25 successively and in spaced arrangement. The conveyor belts 25 will convey the segments toward the conveyor shaft roll 24 at the discharge end of the conveyor.

As shown in Figure 1, as the discharging segment leaves the conveyor, the leading portion of the segment (or group of superimposed segments, depending upon whether a single sheet or a plurality of simultaneously-fed sheets are fed to the machine) will contact and rest upon the wall 97 of the stack supporting member 94, the intermediate portion of the segment will contact the frictional sleeve 99 and the trailing edge of the segment will fall and rest upon the angularly disposed wall 96 of the supporting member 94. The stacking receiver 91 is actuated by the crank member 107 to move outwardly away from the discharge end of the conveyor and in centrally-aligned relation with, at substantially the same speed as, and beneath each successively discharging segment or segment group whereby the successive segments or successive groups of segments may fall upon the stacking receiver 91 in neatly stacked arrangement. The roughened surface of the friction tube 99 serves to prevent the stacked segments from sliding with respect to the stacking receiver 91. It will be noted that the segment stack is in the form of an inverted V in cross-section. When the desired number of segments have been stacked upon the receiver 91, the operator may remove the segments by inserting a stack receiving element in the space between the apex of the V-shaped stack and the upper portion 98 of the stack supporting member 94 and thereby lift the segment stack upwardly off the receiver 91.

Although it will be obvious that the segments or segment groups will be placed upon the conveyor at constant intervals irrespective of the lengths of the segments being cut, a variation in the lengths will result in an advance or retardation of the timing of the arrival of the centers of the segments at the discharge end with respect to the rotary cycle of the cutting knife 64 and the reciprocating cycle of the receiver 91. That is, assuming that the crank member 107 has been adjusted for a particular length of segment so that the centers of the discharging segments are directly above the stacking rod 93 as the segments fall from the conveyor, it will be seen that if the speed of the driver feed roll 51 is increased so as to produce a longer segment, the trailing edges of the segments or segment groups on the conveyor belts 25 will be at substantially the same positions on the belts as were the trailing edges of the shorter segments. However, it will be obvious that the leading edges of the longer segments will be positioned with respect to the belts 25 ahead of the positions of the leading edges of the shorter segments and, consequently, the centers of the longer segments will be positioned on the belts 25 in advance of the positions that would be occupied by the centers of shorter segments. This increase in length of the segments will result in the longer segments being stacked in an offset position to the right of the receiver 91 rather than centrally-aligned therewith. However, by providing that the driven crank plate 109 be drivingly connected to the drive crank plate 108 in a selected angular relationship, the reciprocating cycle of the receiver 91 may be advanced or retarded with respect to the rotary cycle of the cutting knife 64 so as to coordinate with the advanced or retarded timing of the arrival of the centers of the segments at the discharge end of the conveyor.

For instance, in the situation above described where the segments are to be made of greater length, the operator would first adjust the positions of the yokes 34 and 44 to increase the speed of the driver feed roll 51 and then would withdraw the spring-pressed detent 116 from its engaged recess 114 and rotate the driven crank plate 109 in a clockwise direction, as viewed in Figure 1, so as to enable the reciprocatory cycle of the receiver 91 to be advanced and properly timed with the advanced timing of the arrival of the centers of the longer segments at the discharge end of the conveyor. As shown in Figures 2, 4 and 6, a fixed pointer 127 cooperates with indicia markings 128 on the periphery of the driven crank plate 109 to indicate the required angular setting of the plate 109 for a particular speed of the driver feed roll 51 so as to centrally align the receiver during its outward or receiving stroke with the discharging segment or group of segments leaving the discharge end of the conveyor. The stacking receiver 91 will receive a segment or group of segments during each outward stroke in a direction away from the discharge end of the conveyor and then will return to complete its reciprocatory cycle before again moving outwardly to receive the next successive segment or group of segments from the belts 25 in stacked relation to the previous segment or group of segments.

We claim:

1. A cutting and stacking machine comprising means for cutting a continuous sheet of material into segments, means for actuating said cutting means at a constant speed, means for feeding a continuous sheet to said cutting means at a variable predetermined speed depending upon the desired length of the segments to be cut, a pair of spaced horizontal conveyor rolls, one roll located adjacent the cutting means and the second roll spaced therefrom, a substantially horizontal continuous conveyor belt looped around said rolls, means for driving said conveyor belt at a constant speed in a direction whereby the upper portion of the looped belt travels toward said second roll, means for successively placing said segments upon said upper belt portion at predetermined constant intervals independent of the lengths of the segments being cut, a stacking receiver adjacent said second roll, means for slidably supporting said receiver for horizontal reciprocal movement in a path parallel to the direction of belt movement and in a plane below said second roll, and means adjustable in accordance with the length of the segments being cut for moving said receiver at substantially the same speed as and beneath and in centrally aligned relation with each successive segment when the segment leaves the belt as the latter loops around said second roll whereby the successively discharged segments may fall upon the receiver in aligned stacked arrangement.

2. A mechanism for receiving sheet material segments from a conveyor and stacking the same comprising a stacking receiver, means slidably supporting the receiver for horizontal reciprocal movement, a rotatably mounted drive plate, means for rotating said plate, a second plate rotatably mounted about the axis of rotation of the drive plate and freely movable with respect to said drive plate, an adjustable positive driving connection means between said plates for connecting said second plate to said drive plate in any one of several selectable angular relationships, and means connecting said second plate and said receiver for converting the rotary motion of the second plate to reciprocatory motion of the receiver.

3. A mechanism for receiving sheet material segments from a conveyor and stacking the same comprising a stacking receiver, means slidably supporting the receiver for horizontal reciprocal movement, a rotatably mounted drive plate, means for rotating said plate, a second plate rotatably mounted about the axis of rotation of the drive plate and adjacent the latter and freely movable with respect to said drive plate, a plurality of recesses in one of said plates, a spring-pressed detent carried by the other of said plates for selective engagement in said recesses whereby the plates may be drivingly connected in any one of several angular relationships, and means connecting said second plate and said receiver for converting the rotary motion of the second plate to reciprocatory motion of the receiver.

4. A mechanism for receiving sheet material segments from a conveyor and stacking the same comprising a rotatably mounted drive plate, means for rotating said plate, a crank plate rotatably mounted about the axis of rotation of the drive plate and adjacent the latter, a plurality of recesses in one of said plates circularly spaced about the axis of rotation of said plates, a spring-pressed detent slidably mounted in the other of said plates for selective engagement in said recesses whereby the plates may be drivingly connected in any predetermined one of several angular relationships, a crank pin mounted on the crank plate and offset from the axis of rotation of the plates, a carriage, means for slidably mounting the carriage for horizontal reciprocal movement, a stacking receiver removably mounted on the carriage, and a connecting link connecting said crank pin and said carriage for converting the rotary motion of the crank pin to reciprocatory motion of the carriage.

5. A cutting and stacking machine comprising means for periodically cutting a continuous sheet of material into segments, means for feeding a continuous sheet to said cutting means at a variable predetermined speed depending upon the desired length of the segments to be cut, a conveyor for conveying the segments away from said cutting means and having a discharge end, means for successively placing said segments upon said conveyor at predetermined constant time intervals independent of the lengths of the segments being cut, a rotatably mounted drive member, a driven member rotatably mounted on the same axis of rotation as the drive member and freely movable with respect thereto, an adjustable drive connection between said drive and driven members for selectively securing said members to each other in any one of a plurality of angular relationships, means for actuating said drive member, conveyor and cutting means at a constant speed and in a predetermined cyclical relationship whereby for each position of the cutting means in its cycle of operation the drive member will be at a particular predetermined phase of its own cycle, a stacking receiver reciprocably mounted adjacent the discharge end of the conveyor, means connecting said driven member and said receiver for converting the rotary motion of the driven member to reciprocatory motion of the receiver, and indicia means on said driven member for indicating the proper angular relationship of said drive and driven members in accordance with the predetermined speed of the feeding means whereby the reciprocatory cycle of the receiver may be timed so as to centrally align the receiver with each successively discharging segment in accordance with the lengths of the segments being cut.

6. A cutting and stacking machine comprising intermittently operating means for cutting continuous sheet material into segments, a conveyor for conveying cut segments away from said cutting means, and a reciprocable stacking receiver disposed below the discharge end of said conveyor, means for driving said cutting means, conveyor and receiver at constant relative speeds, means for feeding continuous sheet material to said cutting means at variable relative speed whereby segments of varying length may be cut, and means for varying the time relationship of the stroke of said receiver relative to the operation of said cutting means.

7. The combination set forth in claim 6, wherein said means for varying the time relationship of the stroke of said receiver relative to the operation of said cutting means comprises a rotary driving member and a rotary member driven thereby, and means for varying the angular relationship between said rotary members.

8. A cutting and stacking machine comprising intermittently operating means for cutting continuous sheet material into segments, a conveyor for conveying cut segments away from said cutting means, and a horizontally reciprocable stacking receiver disposed below the discharge end of said conveyor, means for driving said cutting means, conveyor and receiver at constant relative speeds, means for feeding the continuous sheet material to said cutting means at variable relative speed whereby segments of varying length may be cut, and means for varying the time relationship of the stroke of said receiver relative to the operation of said cutting means, whereby segments of varying length may be received on said receiver in centrally aligned relationship, said time relationship varying means including a rotary driving plate and a plate driven thereby, a plurality of recesses in one of said plates and a spring-pressed detent in the other of said plates for selective engagement in said recesses.

FRANK R. PIPER.
JAMES M. GARDNER.

REFERENCES CITED

The following references are of record in the file of this patent:

UNITED STATES PATENTS

| Number | Name | Date |
| --- | --- | --- |
| 594,055 | Wood | Nov. 23, 1897 |
| 965,375 | Dean | July 26, 1910 |
| 1,107,762 | Cumfer | Aug. 18, 1914 |
| 1,270,334 | Schumacher | June 25, 1918 |
| 1,444,705 | Rigler | Feb. 6, 1923 |
| 2,355,105 | Preston | Aug. 8, 1944 |